(12) United States Patent
Kane

(10) Patent No.: US 9,441,075 B1
(45) Date of Patent: Sep. 13, 2016

(54) SYNTHESIS OF SOLUBLE CONDUCTING POLYMERS BY ACOUSTIC MIXING

(71) Applicant: Sandia Corporation, Albuquerque, NM (US)

(72) Inventor: Marie C. Kane, Danville, CA (US)

(73) Assignee: Sandia Corporation, Albuquerque, NM (US)

( * ) Notice: Subject to any disclaimer, the term of this patent is extended or adjusted under 35 U.S.C. 154(b) by 216 days.

(21) Appl. No.: 14/249,057

(22) Filed: Apr. 9, 2014

(51) Int. Cl.
*H01B 1/00* (2006.01)
*C08G 73/02* (2006.01)
*H01B 1/12* (2006.01)

(52) U.S. Cl.
CPC ........... *C08G 73/0266* (2013.01); *H01B 1/128* (2013.01)

(58) Field of Classification Search
CPC .................................. H01B 1/00; H01B 1/128
See application file for complete search history.

(56) References Cited

U.S. PATENT DOCUMENTS

| | | | | |
|---|---|---|---|---|
| 6,696,138 | B2 * | 2/2004 | Sakai .................... | H01G 9/0036 252/510 |
| 2004/0065969 | A1 * | 4/2004 | Chatterjee ................ | B01J 13/14 264/4.1 |
| 2012/0193584 | A1 * | 8/2012 | Jin ......................... | H01B 1/127 252/500 |
| 2014/0036415 | A1 * | 2/2014 | Tsai ....................... | H01G 9/028 361/525 |
| 2014/0065402 | A1 * | 3/2014 | Suckeveriene .......... | H01B 1/24 428/220 |

OTHER PUBLICATIONS

Liu et al., "Structure, Conductivity and Thermopower of Crystalline Polyaniline Synthesized by the Ultrasonic Irradiation Polymerization Method," Macromolecules, 35, pp. 9414-9419 (2002).*
Academprylad Ltd Product Data Sheet Ultrasonic dispergator UZDN-A (no pub date) www.ukrrospribor.com.*
Konoshchuk et al "Effect of sonication on the structure and properties of polyaniline doped with organic sulfonic acids", Theoretical and Experimental Chemistry, vol. 49, No. 4, Sep. 2013, pp. 241-247.*
Li et al "Effects of ultrasonic irradiation on the morphology of chemically prepared polyaniline nanofibers", Journal of Applied Polymer Science, vol. 113, 868-875 (2009).*
Jing et al "Sonochemical synthesis of polyaniline nanofibers", Ultrasonics Sonochemistry 14 (2007) 75-80.*

* cited by examiner

*Primary Examiner* — Mark Kopec
(74) *Attorney, Agent, or Firm* — Blakely, Sokoloff, Taylor & Zafman, LLP

(57) ABSTRACT

A method including combining an aniline monomer, an oxidant, water and an organic solvent; subjecting the combination to acoustic mixing to form an emulsion; and recovering a polyaniliine from the combination. A method including combining a aniline monomer, an oxidant, water and an organic solvent; forming a polyaniline by acoustic mixing the combination; and recovering the polyaniliine from the combination. A method including forming a combination of an aniline monomer, an oxidant, water and an organic solvent in the absence of an emulsifier; acoustic mixing the combination for a time period to form a polyaniline; and recovering a polyaniliine from the combination.

15 Claims, 1 Drawing Sheet

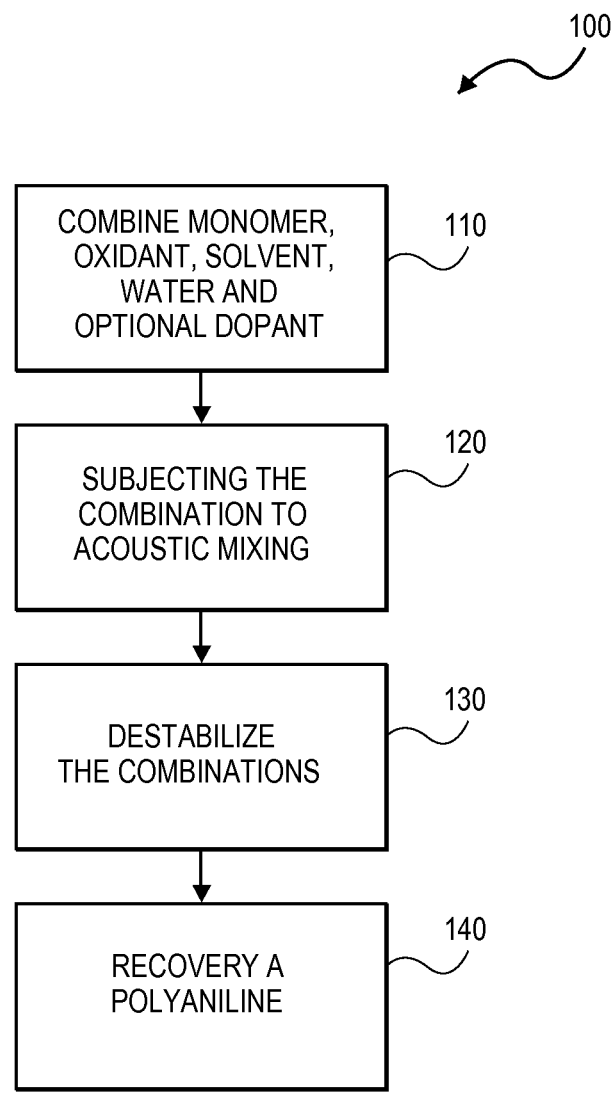

SYNTHESIS OF SOLUBLE CONDUCTING POLYMERS BY ACOUSTIC MIXING

STATEMENT OF GOVERNMENT RIGHTS

This invention was developed under Contract DE-AC04-94AL85000 between Sandia Corporation and the U.S. Department of Energy. The U.S. Government has certain rights in this invention.

FIELD

Conducting polymers and their manufacture.

BACKGROUND

Polyaniline is a polymer that has been explored as an organic conducting material. It is relatively inexpensive, it can be readily synthesized via chemical or electrochemical methods and it is environmentally stable. As a conducting polymer, polyaniline has found use in the microelectronic industry, photovoltaics, batteries, fuel cells and sensors. Other attractive fields for utilization of polyaniline include anti-statics, electrostatic dissipation (ESD) coatings, electromagnetic interference (EMI) shielding, anti-corrosive coatings, hole injection layers, transport conductors, ITO replacements, actuators and electrochromic coatings.

Polyaniline is synthesized from aniline and can be found in one of three oxidation states: leucoemeraldine; emeraldine; and (per)nigraniline. Processing polyaniline from aniline monomer presents some difficulty as it is a rather insoluble crosslinked powder that does not readily melt. One synthesis is developed that uses an emulsion technique to produce a final product in a castable form in a solvent (e.g., toluene, xylene, hexane, etc.) so that polyaniline can be made into films. One reproducible synthesis of this form utilizes dodecylbenzene sulfonic acid (DBSA) as the dopant, because DBSA acts not only as a dopant but also as an emulsifying agent.

Drawbacks to the DBSA approach are that DBSA generally does not provide high conductivity and a process to separate out excess dopant to achieve a relatively pure product is often tedious and time consuming.

SUMMARY

A process of making polyaniline is described. In one embodiment, the process starts from an aniline monomer and the monomer is combined with an oxidant, an organic solvent and water. A dopant may also be included. The process utilizes acoustic mixing to mix the combination and promote the growth of the polymer. The combination described combines a non-polar solvent with water. Thus, in one aspect, the acoustic mixing stabilizes (e.g., emulsifies) the combination allowing a polymer to be formed. Thus, by using acoustic mixing, a stabilizer (e.g., an emulsifier or emulsifying agent) may be avoided. Accordingly, improved conductivity can be achieved and minimal post-synthesis processing is necessary.

BRIEF DESCRIPTION OF THE DRAWINGS

The invention may best be understood by referring to the following description and accompanying drawings that are used to illustrate embodiments of the invention. In the drawings:

FIG. 1 describes a process of forming a polyaniline.

DETAILED DESCRIPTION

FIG. 1 describes a process of forming a polyaniline. Referring to FIG. 1, in one embodiment, the method includes combining an aniline monomer, an oxidant, a solvent and water (block 110). In one embodiment, an oxidant is, for example, ammonium persulfate. Suitable solvents include, but are not limited to, generally hydrophobic organic solvents such as toluene, xylene or hexane. In one embodiment, a dopant is also included in the combination. In one embodiment, the dopant is selected for its ability to impart high conductivity onto the polyaniline such as by its ability to protonate the polyaniline. Suitable dopants include any acid capable of protonating the imine nitrogen, including, but not limited to, dodecylbenzene sufonic acid (DBSA), hydrochloric acid or camphor sulfonic acid. As noted above, prior processes used DBSA as a dopant and also as an emulsifying agent in a process for forming polyaniline. In the described process, no emulsifier is necessary. Thus, DBSA's property as an emulsifier is irrelevant.

Referring to FIG. 1, process 100 also includes subjecting the combination to acoustic mixing (block 120). In one embodiment, a suitable acoustic mixer is a LABRAM™ mixer or a RESONANTACOUSTIC™ mixer commercially available from Resodyn Acoustic Mixers, Inc. of Butte, Mont. Such acoustic mixers are operated at a resonant frequency utilizing an electromechanical oscillator to excite the mixed material (i.e., the combination). The acoustic mixer may operate at a frequency from about 15 Hertz to about 2000 Hertz. In another embodiment, a suitable frequency is on the order of about 30 Hertz to about 1000 Hertz. The combination includes a non-polar organic solvent and water, two solutions that do not mix. The oscillation by acoustic mixing simulates or creates an emulsion of the combination. Thus, an emulsion may be stabilized by the mixing process itself and in the absence of one or more stabilizing agents (e.g., emulsifying agent) are needed.

A combination is stabilized through the acoustic mixing to allow a reaction to occur to produce polyaniline. Representatively, polyaniline may be produced by stabilizing the combination or (subjecting the combination to acoustic mixing) for a period of at least one hour at room temperature. Increasing the temperature of the combination or reaction mixture can increase the reaction time. Following an adequate reaction, the combination is destabilized (block 130). The combination is destabilized by halting the acoustic mixing. The destabilization causes the water and solvent phase of the combination to separate. The product (polyaniline) can then be separated with the solvent phase from the rest of the combination (water phase) (block 140). Any excess reactants will migrate to the water phase.

The above process accelerates the production of polyaniline because it makes the separation of polyaniline from the reaction mixture relatively straightforward. Also, because there is no need for an emulsifying agent or other stabilizing agent, a maximum conductivity of the polyanine product may be achieved where heretofore such conductivity may have been limited by incorporating an emulsifying agent such as DBSA. The polyaniline produced may be utilized in any of the variety of uses to which polyaniline has been exploited.

Heretofore, the description related to forming polyaniline (e.g., conductive polyaniline) from a monomer combination containing an organic solvent and water. The description also described a use of acoustic mixing to stabilize an otherwise unstable mixture to allow a polymerization reaction to proceed. It is appreciated that such process can be used for other reaction mixtures, including other polymerization reactions.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated in the figure to indicate corresponding or analogous elements, which may optionally have similar characteristics.

It should also be appreciated that reference throughout this specification to "one embodiment", "an embodiment", "one or more embodiments", or "different embodiments", for example, means that a particular feature may be included in the practice of the invention. Similarly, it should be appreciated that in the description, various features are sometimes grouped together in a single embodiment, figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A method comprising:
   forming a combination of an aniline monomer, an oxidant, water and an organic solvent at a frequency of 15 Hertz to 2000 Hertz;
   subjecting the combination to acoustic mixing at a frequency of 15 Hertz to 2000 Hertz to form an emulsion; and
   recovering a polyaniline from the combination.

2. The method of claim 1, wherein the combination further comprises a dopant.

3. The method of claim 2, wherein the dopant comprises an acid.

4. The method of claim 1, wherein subjecting the combination to acoustic mixing comprises acoustic mixing at a frequency of 30 Hertz to 1000 Hertz.

5. The method of claim 1, wherein subjecting the combination to acoustic mixing comprises subjecting for a period of at least one hour at room temperature.

6. A method comprising:
   forming a combination of an aniline monomer, an oxidant, water and an organic solvent at a frequency of 15 Hertz to 2000 Hertz;
   forming a polyaniline by acoustic mixing the combination at a frequency of 15 Hertz to 2000 Hertz; and
   recovering the polyaniline from the combination.

7. The method of claim 6, wherein the combination further comprises a dopant.

8. The method of claim 7, wherein the dopant comprises an acid.

9. The method of claim 6, wherein the acoustic mixing comprises acoustic mixing at a frequency of 30 Hertz to 1000 Hertz.

10. The method of claim 6, wherein forming the polyaniline comprises subjecting the combination to acoustic mixing for a period of at least one hour at room temperature.

11. A method comprising:
    forming a combination of an aniline monomer, an oxidant, water and an organic solvent in the absence of an emulsifier;
    acoustic mixing the combination at a frequency of 15 Hertz to 2000 Hertz for a time period to form a polyaniline; and
    recovering a polyaniline from the combination.

12. The method of claim 11, wherein the combination further comprises a dopant.

13. The method of claim 12, wherein the dopant comprises an acid.

14. The method of claim 11, wherein acoustic mixing comprises acoustic mixing at a frequency of 30 Hertz to 1000 Hertz.

15. The method of claim 1, wherein the time period comprises at least one hour at room temperature.

* * * * *